Patented Mar. 13, 1945

2,371,418

UNITED STATES PATENT OFFICE 2,371,418

REACTION OF UNSATURATED ORGANIC COMPOUNDS WITH NITROSYL CHLORIDE

Leland James Beckham, Geddes, and John Alexander Crowder, Syracuse, N. Y., assignors to The Solvay Process Company, New York, N. Y., a corporation of New York No Drawing. Application December 30, 1941, Serial No. 424,944

9 Claims. (Cl. 260—647)

This invention relates to the manufacture of nitrosyl chloride addition products of organic compounds containing a non-aromatic ethylenic linkage.

The nitrosyl chloride addition products prepared from such unsaturated compounds are believed to comprise largely organic nitroso chloro compounds having the chlorine atom and nitroso group upon adjacent carbon atoms; the isomeric oximes; the chloro derivatives formed by substitution of chlorine for a remaining hydrogen of the nitroso-substituted carbon of the nitroso chloro compounds; and dimers of the nitroso chloro compounds. A considerable proportion of these products may react further under the conditions of nitrosation to lose nitrogen and form products such as alpha-chlorohydrins and alpha-chloro-ketones.

The nitrosyl chloride addition products (herein termed "nitrosyl chloride adducts") are useful intermediates for the manufacture of sulfonates by reaction with alkali-metal sulfites, ammonium sulfites, or alkali-metal thiosulfates, for the manufacture of phosphonates by reaction with phosphites, for the manufacture of arsonates by reaction with arsenites, and for the manufacture of other types of addition products formed by reaction of the nitrosyl chloride adducts with such compounds as taurine salts, salts of N-methyl taurine, pyridine, and thiocyanates. They may be reduced or aminated to form amines.

The nitrosyl chloride adducts are of particular utility for the formation of sulfonates by reaction with alkali-metal or ammonium sulfites as described and claimed in United States Patent 2,265,993 to Leland J. Beckham; the sulfonates prepared from unsaturated organic compounds containing one or two non-aromatic ethylenic groups and containing between 10 and 30 carbon atoms per ethylenic group and having at least 8 carbon atoms disposed as a continuous carbon chain, are especially suitable as detergents, wetting agents, emulsifying agents and the like.

Where reference is made herein to unsaturated organic compounds, it should be understood that compounds containing a non-aromatic ethylenic, C=C, linkage are referred to. Thus, olefins and substituted olefins as well as alicyclic compounds containing at least one C=C group, either in the alicyclic nucleus or in a carbon chain substituent group are included.

Nitrosyl chloride addition products of olefins and their carboxylic derivatives (such as unsaturated carboxylic acids and their esters, salts, amides, chlorides, and nitriles) constitute preferred starting materials. Mono-olefinic compounds with between 10 and 30 carbon atoms in the molecule and mixtures thereof are particularly attractive materials for the preparation of such products.

The olefins may be straight chain olefins or secondary or tertiary branched chain olefins. Olefins containing a single non-aromatic ethylenic linkage are preferred but unsaturated organic compounds containing two or more such linkages, for instance diesters of dicarboxylic acids with unsaturated alcohols, may be used. The ethylenic linkages may be located in a terminal position or in an intermediate position.

The source of the olefin may be animal, vegetable or mineral. Thus, suitable olefins may be prepared by dehydrating alcohols obtained by hydrogenation of naturally-occurring fats and oils, such as tallow, palm oil, coconut oil, olive oil, or the corresponding free acids, or the olefins may be prepared by the Fischer-Tropsch synthesis or by cracking waxes or by cracking or dehydrogenating natural or synthetic (Fischer-Tropsch) petroleum or petroleum fractions or by halogenating and dehydrohalogenating such materials or by polymerizing low molecular weight olefins.

Olefinic mixtures containing olefins and non-olefinic hydrocarbons derived from natural or synthetic petroleum immediately or by thermolytic treatments constitute highly satisfactory initial materials for the preparation of nitrosyl chloride adducts. Thermolytic treatments which have been found to yield large proportions of suitable olefins are catalytic and non-catalytic cracking, catalytic dehydrogenation, and combinations thereof. Paraffinic, aromatic, or alicyclic hydrocarbons or other relatively inert diluent liquids, especially liquids which are solvents for the olefin or olefins being reacted, may be present during the formation of the nitrosyl chloride olefin adducts.

Examples of suitable olefins are cetene (derived from spermaceti and comprising for the most part cetene-1), 2-methyl-pentadecene-2, dodecene-1, pentadecene-7, tricosene-11, nondecene-9, 10-methyl nondecene-9, and olefin-containing mixtures obtained by cracking topped, crude, natural or synthetic petroleum or by dehydrogenating a petroleum distillate, such as gas oil, or by reacting carbon monoxide and hydrogen in the presence of a catalyst such as cobalt (the Fischer-Tropsch synthesis). Some synthetic petroleums contain relatively high proportions of olefins as compared with natural petroleum and hence are more suitable for use without a concentration or thermolysis to increase the olefin content.

Suitable substituted olefins are esters of unsaturated fatty acids such as acrylic acid and oleic acid, mono- and di-esters of maleic acid or mixtures such as the alkenyl succinic acid esters obtained by condensation of maleic anhydride with olefin fractions obtained by cracking or dehydrogenating natural or synthetic petroleum or by catalytic processes, such as the Fischer-Tropsch synthesis, and esterification of the unsaturated dicarboxylic acid anhydride formed, with saturated mono-, di- or trihydroxy alcohols, such as methanol, ethanol, propanol, isopropanol, the butanols and pentanols, glycol and glycerin and their homologs, lauryl alcohol, myristyl alcohol and cetyl alcohol; the esters of saturated fatty acids, such as acetic, lauric and stearic acids with unsaturated alcohols, such as allyl alcohol and its homologs; the mono-esters and the symmetrical and unsymmetrical di-esters of succinic acid with unsaturated alcohols or with an unsaturated alcohol on the one hand and a saturated alcohol on the other; the free oleic and alkenyl succinic acids and their alkali-metal salts and acid chlorides, and their amides formed from amines such as dimethyl amine, methyl butyl amine, ethyl butyl amine, etc.; and unsaturated ketones. Specific examples are butyl oleate, oleic acid, methyl oleate, isopropyl oleate, allyl stearate, allyl laurate, di-n-octyl-(octenyl, nonenyl, decenyl, or undecenyl) succinate, oleic acid amide, N-methyl oleic acid amide, N-dimethyl oleic acid amide, oleic acid anhydride, oleic acid chloride, oleic acid nitrile, N-allyl lauric acid amide, N-oleyl butyric acid amide, N-methyl N-oleyl propionic acid amide, N-ethyl N-oleyl acetic acid amide, N-methyl N-lauryl 4-hexenoic acid amide, N-decyl 3-pentenoic acid amide, 3-methyl-4-dimethyl-cyclopentane-1-carboxylic acid ester of allyl alcohol, and oleone.

Examples of suitable unsaturated ring compounds are n-lauryl cyclohexene and Δ²-3-methyl-4-dimethyl-cyclopentene-1-carboxylic acid ester of butanol-1.

In accordance with the present invention nitrosyl chloride adducts of unsaturated compounds of the type above described are prepared by reacting the unsaturated compound with nitrosyl chloride in the presence of alkali-metal carbonate, for example, normal sodium carbonate or normal potassium carbonate.

In the manufacture of the nitrosyl chloride adducts in the absence of alkali-metal carbonate complete reaction of the unsaturated compound requires sufficient nitrosyl chloride to fix as organically-bound chlorine from 1½ to 2 chlorine atoms per ethylenic linkage. This is an average figure and does not mean that each molecule of adduct contains such a proportion of chlorine. On the contrary, it seems highly probable that there is a concentration of chlorine atoms in only some molecules while others contain only one atom per ethylenic group.

By conducting the nitrosyl chloride addition in the presence of an alkali-metal carbonate in accordance with the invention, a higher ultimate yield of products reactive to produce desirable sulfonates, phosphonates, and the like is obtainable based on the quantity of unsaturated organic compound reacted. The improvement in quality of the product is reflected in a substantially lower organically bound chlorine content and the products formed by the improved process contain only about 1 atom of chlorine per reacted ethylenic group, 30 per cent to 50 per cent less than the products obtained in the absence of the carbonate with the same proportion of olefin consumed.

The process of the present invention may be conducted in the presence or, in the case of liquids, in the absence of inert non-aqueous solvents for the unsaturated organic compound and preferably for the nitrosyl chloride.

The process may be carried out by introducing the nitrosyl chloride either as a liquid or as a gas and at temperatures from below zero up to 80° C. At low temperatures the reaction proceeds relatively slowly, however, and at high temperatures the product formed is frequently contaminated with dark-colored impurities which discolor the adduct.

In conducting the process of the present invention, it is preferred to employ an amount of sodium carbonate corresponding to between about ½ mol and about 1 mol per ethylenic group and to introduce the nitrosyl chloride into an agitated mixture of the sodium carbonate and organic compound in these proportions while maintaining the mixture at a temperature between 0° C. and 25° C. For organic compounds containing acidic substituent radicals reactive with carbonate a larger proportion of the sodium carbonate is desirable than for non-acid olefins. The amount of nitrosyl chloride introduced may vary, depending upon the desired extent of reaction and upon the degree of reactivity possessed by the unsaturated organic compound. Normally between about 1¼ and about 4 mols of nitrosyl chloride per ethylenic group, depending upon the compound treated and the conditions of reaction, will suffice to react substantially all of the unsaturated organic compound; up to 3 mols of the NOCl may react, depending upon reaction conditions. In most cases it is desirable to effect relatively complete reaction of the C=C bonds. In some cases it may be preferable to limit nitrosation to a lower degree; for example, in the production of detergents from unsaturated compounds containing more than one non-aromatic C=C linkage and less than 10 carbon atoms per unsaturated linkage, nitrosation may be limited to advantage to restrict the number of unsaturated linkages reacted to provide in the product at least 10 carbon atoms per reacted unsaturated linkage.

The following examples further illustrate the process of the invention:

*Example 1.*—Seven portions of a dehydrogenated gas oil fraction produced by the catalytic vapor phase dehydrogenation of a West Virginia crude, which fraction has a boiling range of 100° C. to 225° C. at 10 mm. of mercury absolute pressure and contains between 13% and 14% by weight of olefins (mono-olefins) are mixed or not with sodium carbonate as indicated in the table below and agitated at about 20° C. while gaseous nitrosyl chloride is introduced over periods of about 5 hours. Excess is removed by aeration.

The variable conditions and results are tabulated below. The figures for the "Mol ratio of sulfonate produced to olefins used" provide a measure of the yields of nitrosyl chloride adducts obtained. However, it should be borne in mind that any losses occurring in the conversion of the adducts to the sulfonates are included and hence the actual yields of nitrosyl chloride adducts were probably somewhat higher than the given figures in all cases.

|  | Sample | | | | | | |
|---|---|---|---|---|---|---|---|
|  | A | B | C | D | E | F | G |
| Mol ratio of Na₂CO₃ to olefins used | 0 | ½ | ½ | 1 | 1 | 1 | 1 |
| Mol ratio of NOCl to olefins used | 3 | 2½ | 2½ | 2½ | 3 | 4 | 2⅔ |
| Mol ratio of sulfonate produced to olefins used | .60 | .63 | .71 | .76 | .73 | .78 | .86 |
| Gram atoms of chlorine in product per mol olefins used |  |  |  |  |  |  | .88 |
| Gram atoms of nitrogen in product per mol olefins used |  |  |  |  |  |  | .96 |

*Example 2.*—Three samples of cetene-1 were treated with NOCl by passing the NOCl through the cetene-1 alone or in admixture with finely divided (100 mesh) anhydrous sodium carbonate. The proportion of olefin reacted was determined by iodine number and the products were analyzed for organic chlorine. The data for these tests follow.

|  | Sample | | |
|---|---|---|---|
|  | A | B | C |
| Treatment temperature °C | 35 | 20 | 20 |
| Cetene-1 parts by weight | 224 | 224 | 224 |
| Na₂CO₃ do | 30 | 30 | 0 |
| NOCl do | 102 | 90 | 90 |
| Proportion of cetene reacted percent | 100 | 71½ | 75½ |
| Chlorine analysis of product do | 11⅔ | 7.4 | 11 |
| Gram atoms chlorine/mol reacted cetene | .95 | .80 | 1.13 |

The addition products prepared in accordance with the present invention are suitable for the preparation of surface active sulfonate products not only in accordance with the sulfitation processes described in United States Patent 2,265,993 previously referred to, but also by the modifications and improvements thereof described and claimed in United States patent applications of even date, Serial Nos. 424,940, 424,941, 424,942, and 424,943 filed in the name of Leland James Beckham and entitled: "Derivatives of unsaturated compounds and method of making," "Organic sulfonates and method of making," "Manufacture of organic sulfonates," and "Sulfitation of organic compounds," respectively.

We claim:

1. In the manufacture of nitrosyl chloride adducts of organic compounds containing at least one non-aromatic C=C linkage, the improvement which comprises reacting the organic compound with NOCl in a reaction mixture containing a normal alkali-metal carbonate in an amount at least sufficient to limit the maximum amount of organically bound chlorine in the adduct to an average of about one atom per reacted non-aromatic —C=C— linkage.

2. In the manufacture of nitrosyl chloride adducts of organic compounds containing at least one non-aromatic C=C linkage, the improvement which comprises introducing NOCl into a mixture comprising the organic compound in admixture with between about ½ mol and about 1 mol of normal alkali-metal carbonate for each non-aromatic C=C linkage.

3. In the manufacture of nitrosyl chloride adducts of organic compounds containing at least one non-aromatic C=C linkage, the improvement which comprises introducing NOCl into a mixture comprising the organic compound in admixture with between about ½ mol and about 1 mol of normal alkali-metal carbonate for each C=C linkage, and continuing the introduction of NOCl until between about 1¼ and about 3 mols of NOCl have been reacted per non-aromatic C=C linkage.

4. In the manufacture of nitrosyl chloride adducts of organic compounds containing from 1 to 2 non-aromatic C=C linkages and between 10 and 30 carbon atoms per non-aromatic C=C linkage, the improvement which comprises introducing NOCl into a mixture comprising the organic compound in admixture with between about ½ mol and about 1 mol of normal alkali-metal carbonate for each non-aromatic C=C linkage, maintained at a temperature between 0° and 25° C.

5. In the manufacture of nitrosyl chloride adducts of hydrocarbons containing one alkenyl radical and between 10 and 30 carbon atoms, the improvement which comprises reacting the hydrocarbon with NOCl in a reaction mixture containing at least ⅓ mol of a normal alkali-metal carbonate per mol of said hydrocarbon.

6. In the manufacture of nitrosyl chloride adducts of hydrocarbons containing one alkenyl radical and between 10 and 30 carbon atoms, the improvement which comprises introducing NOCl into a mixture comprising the hydrocarbon in admixture with between about ½ mol and about 1 mole of normal alkali-metal carbonate for each mol of said hydrocarbon, and continuing the introduction of NOCl until between about 1¼ and about 3 mols of NOCl have been reacted per mol of said hydrocarbon.

7. In the manufacture of nitrosyl chloride adducts of hydrocarbons containing one alkenyl radical and between 10 and 30 carbon atoms, the improvement which comprises introducing NOCl into a mixture comprising the hydrocarbon in admixture with between about ½ mol and about 1 mol of normal alkali-metal carbonate for each mol of said hydrocarbon maintained at a temperature between 0° and 25° C., and continuing the introduction of NOCl until between about 1¼ and about 3 mols of NOCl have been reacted per mol of said hydrocarbon.

8. In the manufacture of nitrosyl chloride adducts of mono-olefins, the improvement which comprises introducing NOCl into a mixture containing the mono-olefins in admixture with at least ⅓ mol of a normal alkali-metal carbonate per mol of said mono-olefins.

9. In the manufacture of nitrosyl chloride adducts of mono-olefins containing between 10 and 30 carbon atoms, the improvement which comprises introducing NOCl into a mixture comprising the mono-olefin in admixture with between about ½ mol and about 1 mol of normal sodium carbonate for each mol of said mono-olefin maintained at a temperature between 0° and 25° C., and continuing the introduction of NOCl until between about 1¼ and about 3 mols of NOCl have been reacted per mol of said mono-olefin.

LELAND JAMES BECKHAM.
JOHN ALEXANDER CROWDER.